(12) United States Patent
Gross et al.

(10) Patent No.: US 11,307,569 B2
(45) Date of Patent: Apr. 19, 2022

(54) ADAPTIVE SEQUENTIAL PROBABILITY RATIO TEST TO FACILITATE A ROBUST REMAINING USEFUL LIFE ESTIMATION FOR CRITICAL ASSETS

(71) Applicant: Oracle International Corporation, Redwood Shores, CA (US)

(72) Inventors: Kenny C. Gross, Escondido, CA (US); Ashin George, San Diego, CA (US); DeJun Li, El Monte, CA (US)

(73) Assignee: Oracle International Corporation, Redwood Shores, CA (US)

( * ) Notice: Subject to any disclaimer, the term of this patent is extended or adjusted under 35 U.S.C. 154(b) by 729 days.

(21) Appl. No.: 16/282,087

(22) Filed: Feb. 21, 2019

(65) Prior Publication Data

US 2020/0272140 A1 Aug. 27, 2020

(51) Int. Cl.
| | |
|---|---|
| G05B 23/02 | (2006.01) |
| G06N 5/04 | (2006.01) |
| G06K 9/62 | (2022.01) |
| G06N 7/00 | (2006.01) |
| G06Q 10/06 | (2012.01) |

(52) U.S. Cl.
CPC ....... *G05B 23/0283* (2013.01); *G06K 9/6256* (2013.01); *G06N 5/04* (2013.01); *G06N 7/005* (2013.01); *G06Q 10/0635* (2013.01)

(58) Field of Classification Search
CPC .. G05B 23/02; G05B 23/0283; G05B 23/024; G06K 9/6256; G06K 9/00536; G06N 5/04; G06N 7/005; G06N 20/00; G06Q 10/0635
See application file for complete search history.

(56) References Cited

U.S. PATENT DOCUMENTS

| | | | |
|---|---|---|---|
| 6,240,372 B1 * | 5/2001 | Gross ............... | G01R 23/16 702/179 |
| 7,269,536 B1 | 9/2007 | Gross et al. | |

(Continued)

OTHER PUBLICATIONS

Gross et al., "Early Detection of Signal and Process Anomalies in Enterprise Computing Systems", Manuscript for the IEEE International Conference on Machine Learning and Applications (ICMLA), Jun. 24-27, 2002, Las Vegas, Nevada.

*Primary Examiner* — Tung S Lau
(74) *Attorney, Agent, or Firm* — Park, Vaughan, Fleming & Dowler LLP

(57) ABSTRACT

The system receives a set of present time-series signals gathered from sensors in the asset. Next, the system uses an inferential model to generate estimated values for the set of present time-series signals, and performs a pairwise differencing operation between actual values and the estimated values for the set of present time-series signals to produce residuals. The system then performs a sequential probability ratio test (SPRT) on the residuals to produce SPRT alarms with associated tripping frequency (TF). While the TF exceeds a TF threshold, the system iteratively adjusts sensitivity parameters for the SPRT to reduce the TF, and performs the SPRT again on the residuals. The system then uses a logistic regression model to compute a risk index for the asset based on the TF. If the risk index exceeds a threshold, the system generates a notification indicating that the asset needs to be replaced.

20 Claims, 12 Drawing Sheets

(56) References Cited

U.S. PATENT DOCUMENTS

| | | | | |
|---|---|---|---|---|
| 7,702,485 B2* | 4/2010 | Gross | ............... | G06F 11/008 |
| | | | | 702/183 |
| 7,917,301 B1* | 3/2011 | Yip | ............... | H01J 49/0036 |
| | | | | 702/19 |
| 8,086,294 B2* | 12/2011 | Echauz | ............... | G16H 50/50 |
| | | | | 702/22 |
| 9,581,570 B2* | 2/2017 | Caicedo | ............... | G01N 29/043 |
| 2004/0068199 A1* | 4/2004 | Echauz | ............... | G06K 9/627 |
| | | | | 600/544 |
| 2004/0162685 A1* | 8/2004 | Gross | ............... | G01R 23/16 |
| | | | | 702/75 |
| 2006/0182210 A1* | 8/2006 | Miller | ............... | H04L 1/0631 |
| | | | | 375/349 |
| 2008/0021342 A1* | 1/2008 | Echauz | ............... | A61B 5/369 |
| | | | | 600/544 |
| 2009/0093975 A1* | 4/2009 | Judd | ............... | G01H 13/00 |
| | | | | 702/56 |
| 2012/0209538 A1* | 8/2012 | Caicedo | ............... | G01N 29/14 |
| | | | | 702/39 |
| 2013/0282003 A1* | 10/2013 | Messerly | ............... | A61B 18/1442 |
| | | | | 606/169 |
| 2015/0330950 A1* | 11/2015 | Bechhoefer | ............... | G01N 29/46 |
| | | | | 73/587 |

* cited by examiner

ADAPTIVE SEQUENTIAL PROBABILITY RATIO TEST TO FACILITATE A ROBUST REMAINING USEFUL LIFE ESTIMATION FOR CRITICAL ASSETS

BACKGROUND

Field

The disclosed embodiments generally relate to techniques for computing the remaining useful life (RUL) of a critical asset based on time-series telemetry signals. More specifically, the disclosed embodiments relate to a technique that uses an adaptive sequential probability ratio test to facilitate a robust RUL estimation for a critical assets based on time-series telemetry signals.

Related Art

The Sequential Probability Ratio Test (SPRT) is a well-known pattern recognition tool, which can be used to facilitate prognostic-surveillance operations for critical assets that produce time-series telemetry signals. (See "Sequential Tests of Statistical Hypotheses," Abraham Wald, Annals of Mathematical Statistics, 16 (2): 117-18, June 1945.) The advantage of using an SPRT is that it facilitates the use of quantifiable and configurable false-alarm and missed-alarm probabilities (FAPs and MAPs) for prognostic-surveillance applications. Moreover, the SPRT has the mathematically provable shortest decision time for detection of subtle anomalies in noisy process variables.

One of the inventors previously devised a diagnostic tool called the "quantitative risk index" (RI) for components inside enterprise computing servers. (See U.S. Pat. No. 7,269,536, entitled "Quantitative Risk Index for Components Monitored by Continuous System Telemetry," by inventors Kenny C. Gross, et al. issued Sep. 11, 2007, referred to as the "'536 patent.") This quantitative RI technique uses an SPRT alarm frequency, or "tripping frequency" (TF), as a metric for determining the relative risk of failure of components inside computer servers.

The advantage in using this quantitative RI technique for aging computer servers is that as internal components age and become less efficient (e.g., fans, power supplies, electrolytic capacitors, etc.), it is not necessary to swap out the internal components that are showing elevated internal temperatures or other problematic parameters. One can instead selectively swap out just the components showing the highest RIs, and not worry about other components with lower RIs.

The same inventor later devised a technique for estimating the RUL of computer servers, by training a machine-learning-based model on the RIs for internal components in a server, and then estimating the probability that the server can make it to the next scheduled maintenance time to replace degrading components. For example, if a server begins producing alarms on Wednesday, and the server is scheduled for preventative maintenance on Saturday, what is the risk of continuing to run the server until the scheduled maintenance window? (See U.S. Pat. No. 7,702,485, entitled "Remaining Useful Life Prediction Technique for Computers Monitored by Telemetry," by inventors Aleksey M. Urmanov, et al., issued Apr. 20, 2010, referred to as the "'485 patent.")

RUL-estimation techniques do not have to be limited to computer servers. RUL estimation can be used to monitor critical components in other industries, such as electrical utilities, oil & gas, manufacturing, and transportation. However, in these other industries, the objectives for using the RUL-estimation technique can be significantly different than for the computer servers. This is because in many industrial applications the goal is not to determine whether the asset can survive until the next shutdown window. The goal is, instead, to run the asset for as long as possible (many months or years), if the RUL-estimation technique can provide assurance that doing so will be unlikely to cause a catastrophic failure. For many industrial use cases, the cost of a critical asset can be very high (e.g., millions of dollars), and the cost involved in refurbishing the asset exceeds the asset's residual. Hence, for these use cases, the goal is to extract as much service from the asset as possible, before replacing the asset.

However, the previously developed RUL-estimation techniques disclosed in the '485 patent, which calculate an RUL for a critical component based on SPRT tripping frequencies, do not forecast RUL accurately after the SPRT tripping frequencies begin to saturate. This is because a saturated SPRT tripping frequency provides little additional information about further increasing degradation of the critical asset.

Hence, what is needed is a technique for performing RUL estimation, which does not suffer from the above-described problems caused by SPRT tripping frequency saturation, to facilitate operating a critical asset as long as possible without risking a catastrophic failure.

SUMMARY

The disclosed embodiments provide a system that estimates a remaining useful life (RUL) of an asset. While operating in a surveillance mode, the system receives a set of present time-series signals gathered from sensors in the asset. Next, the system uses an inferential model to generate estimated values for the set of present time-series signals, and performs a pairwise differencing operation between actual values and the estimated values for the set of present time-series signals to produce residuals. The system then performs a sequential probability ratio test (SPRT) on the residuals to produce SPRT alarms having an associated tripping frequency (TF). While the TF exceeds a TF threshold, the system iteratively adjusts sensitivity parameters for the SPRT to reduce the TF, and performs the SPRT again on the residuals. When the TF for the SPRT alarms falls below the TF threshold, the system uses a logistic regression model to compute an RUL-based risk index for the asset based on the TF. If the risk index exceeds a risk-index threshold, the system generates a notification indicating that the asset needs to be replaced.

In some embodiments, during an inferential-training mode, which precedes the surveillance mode, the system receives an inferential training set of time-series signals gathered from sensors in the asset during normal fault-free operation. Next, the system trains the inferential model to predict values of the time-series signals based on the inferential training set.

In some embodiments, during an RUL-training mode, which follows the inferential training mode and precedes the surveillance mode, the system receives an RUL training set of historical time-series signals gathered from sensors in similar assets while the similar assets were run to failure. The system then uses the inferential model to generate estimated values for the RUL training set of time-series signals, and performs a pairwise differencing operation between actual values and the estimated values for the RUL training set of time-series signals to produce residuals. Next, the system performs an SPRT on the residuals to produce SPRT alarms, and trains the logistic regression model to predict an RUL for the asset based on correlations between the SPRT alarms and associated failure times for the similar assets that experienced failure after long term operation.

In some embodiments, the sensitivity parameters for the SPRT include one or more of the following: a false alarm probability parameter $\alpha$; a missed alarm probability parameter $\beta$; a parameter M associated with a positive mean test and a negative mean test for the SPRT; and a parameter V associated with a nominal variance test and an inverse variance test for the SPRT.

In some embodiments, the TF is a windowed TF, which is associated with a preceding time window of SPRT alarms.

In some embodiments, the asset comprises one of the following: a component in a power generation system; and a component in a power transmission system.

In some embodiments, the inferential model comprises a Multivariate State Estimation Technique (MSET) model.

DETAILED DESCRIPTION

Figure 1:
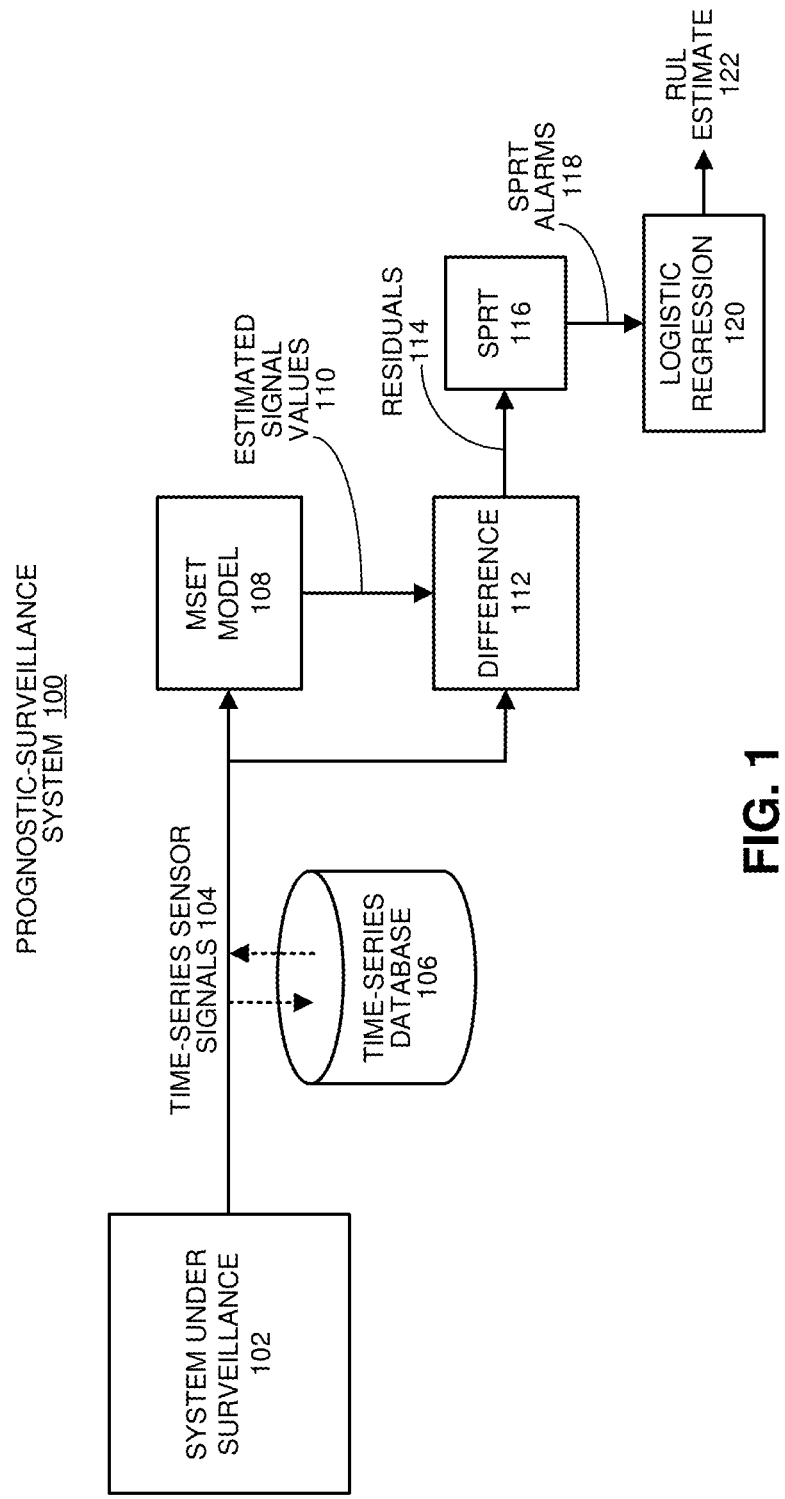
FIG. 1 illustrates a prognostic-surveillance system in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Conventional SPRT-based prognostic surveillance systems, such as the system disclosed in the '536 patent, have been designed to provide early notice of anomalies to facilitate early intervention so that small problems can be fixed before turning into larger problems. Also, conventional RUL methodologies as disclosed in the '485 patent have been designed to determine whether an asset can make it to the next scheduled preventative maintenance shutdown without failing. The systems in the disclosed embodiments make use of some of similar techniques as these prior systems, but they are directed toward a different goal: maximizing the long-term return on investment for expensive assets in spite of aging symptoms. Hence, the disclosed embodiments provide asset owners with quantitative assurance that assets showing aging symptoms (or other performance issues) can be safely operated for as long as possible without risking catastrophic failures.

The technique disclosed in the '485 patent uses an SPRT alarm tripping frequency (TF) to infer the relative severity of various degradation modes. The benefit of using an SPRT TF for gauging the risk of a component failure lies in the fact that the TF is a unitless metric, and scales between zero and one for any physical telemetry variable (e.g., temperatures, voltages, currents, rotating machinery RPMs, vibrations, etc). For our new system, this characteristic is greatly beneficial because it makes it possible to "merge" the relative risk contributions from multiple metrics into a multivariate measure of overall risk for an asset. In contrast, conventional approaches to RUL estimation have encountered issues when researchers tried to "merge" content from different metrics having drastically different units, magnitudes, and signal-to-noise ratios into a metric that indicates the relative risk of continuing to operate an asset after alerts have been generated for one more telemetry metric. For example, when vibrations for a cooling fan begin to grow with age, a cooling fan's speed begins to sag as internal bearings lose roundness, and temperatures begin to rise with long-term changes in internal mechanical friction.

The disclosed embodiments operate by: (1) adapting the SPRT tripping frequency (TF) to a "low noise" environment by using a metric called the "mean cumulative function" (MCF); (2) incorporating the slope of the MCF into a multivariate RUL-estimator framework; and, then (3) integrating this framework into an iterative "adaptive SPRT" outer framework, which facilitates a more-accurate estimate of an asset's long-term RUL. This makes it possible to operate the asset as long as possible, without encountering a catastrophic failure.

Before we describe the operation of this new technique further, we first describe an exemplary prognostic-surveillance system in which the new technique operates.

Prognostic-Surveillance System

FIG. 1 illustrates an exemplary prognostic-surveillance system 100 that accesses a time-series database 106, containing time-series signals in accordance with the disclosed embodiments. As illustrated in FIG. 1, prognostic-surveillance system 100 operates on a set of time-series sensor signals 104 obtained from sensors in a system under surveillance 102. Note that system under surveillance 102 can generally include any type of machinery or facility, which includes sensors and generates time-series signals. Moreover, time-series signals 104 can originate from any type of sensor, which can be located in a component in system under surveillance 102, including: a voltage sensor; a current sensor; a pressure sensor; a rotational speed sensor; and a vibration sensor.

During operation of prognostic-surveillance system 100, time-series signals 104 can feed into a time-series database 106, which stores the time-series signals 104 for subsequent analysis. Next, the time-series signals 104 either feed directly from system under surveillance 102 or from time-series database 106 into an MSET pattern-recognition model 108. Although it is advantageous to use MSET for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

Next, MSET model 108 is "trained" to learn patterns of correlation among all of the time-series signals 104. This training process involves a one-time, computationally intensive computation, which is performed offline with accumulated data that contains no anomalies. The pattern-recognition system is then placed into a "real-time surveillance mode," wherein the trained MSET model 108 predicts what each signal should be, based on other correlated variables; these are the "estimated signal values" 110 illustrated in FIG. 1. Next, the system uses a difference module 112 to perform a pairwise differencing operation between the actual signal values and the estimated signal values to produce residuals 114. The system then performs a "detection operation" on the residuals 114 by using SPRT module 116 to detect anomalies and possibly to generate SPRT alarms 118. (For a description of the SPRT model, please see Wald, Abraham, June 1945, "Sequential Tests of Statistical Hypotheses." *Annals of Mathematical Statistics.* 16 (2): 117-186.) These SPRT alarms 118 feed into a logistic regression model 120 that generates an RUL estimate 122, which can be expressed as a "quantitative risk index" as is described in more detail below.

Adaptive SPRT Technique

Figure 2:
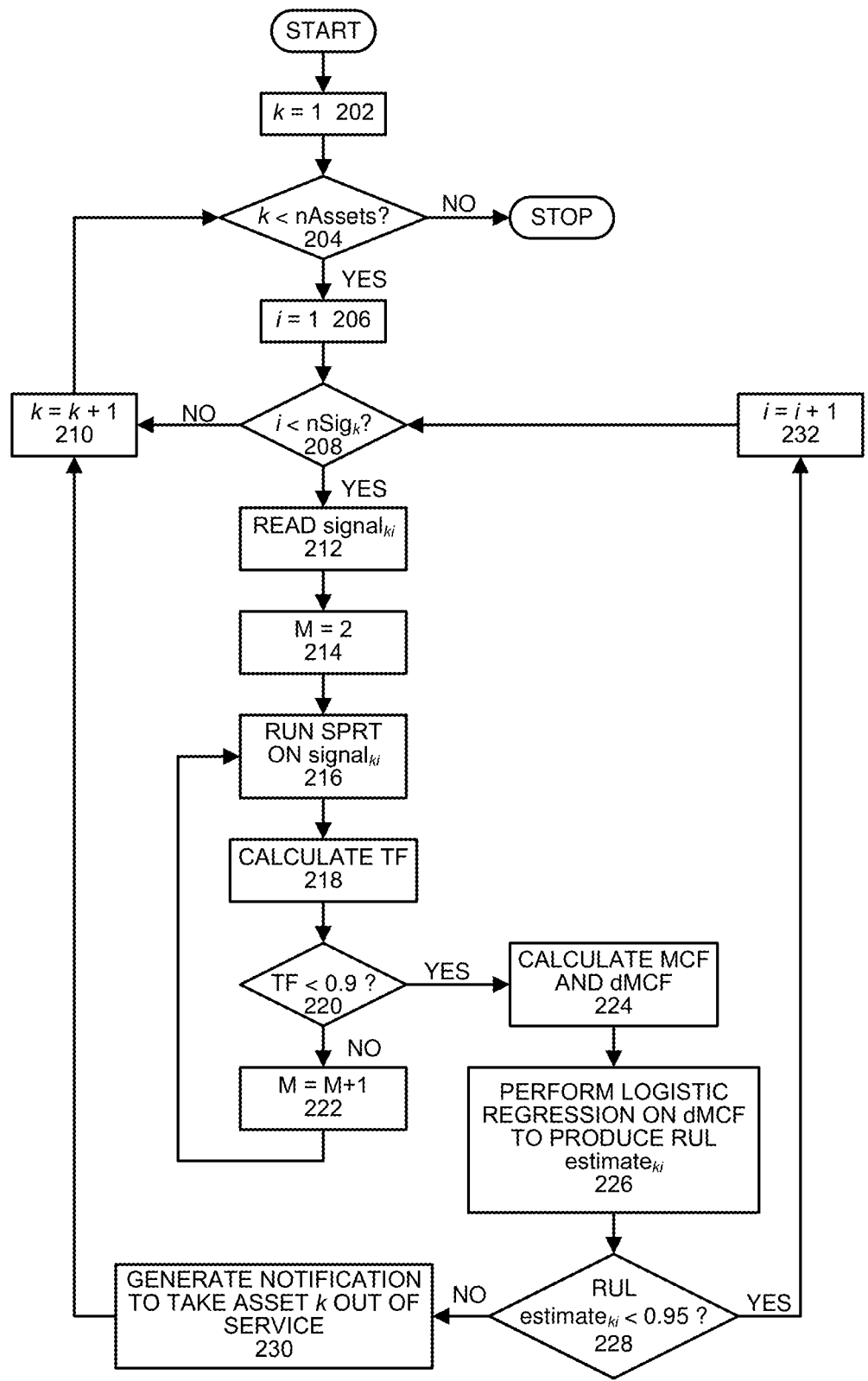
FIG. 2 presents a flow chart illustrating a process that performs an adaptive SPRT to facilitate robust RUL estimation for critical assets in accordance with the disclosed embodiments.

FIG. 2 presents a flow chart illustrating how the above-described system performs an adaptive SPRT technique to facilitate robust RUL estimation for critical assets in accordance with the disclosed embodiments. The system starts by initializing an "asset loop counter" k by setting k=1 (step 202). Next, the system tests k to determine whether k is less than the number of assets being tested k<nAssets (step 204). If not (No at step 204), the system stops. Otherwise, the system initializes a "signal loop counter" i, so that i=1 (step 206), and then tests i to determine whether i is less than the number of telemetry signals for asset k, i<nSig$_k$. If not (NO at step 208), the system increments the asset loop counter k=k+1 (step 210) and returns to step 204. Otherwise, if i is less than the number of telemetry signals (YES at step 208), the system reads signal$_{ki}$ (step 212) and initializes a parameter M, which is associated with a positive mean test and a negative mean test for the SPRT, by setting M=2 (step 214). The system then runs SPRT on signal$_{ki}$ (step 216) and calculates a resulting tripping frequency TF (step 218). Next, the system determines whether TF<0.9 (step 220), which indicates whether or not the SPRT tripping frequency has become saturated. If not (NO at step 220), the system sets M=M+1 (step 222) and returns to step 216. Otherwise, if TF<0.9 (YES at step 220), the system calculates the MCF and dMCF for TF (step 224) and performs a logistic regression on dMCF to produce an RUL estimate$_k$ for signal$_{ki}$ (step 226). The system then determines whether RUL estimate$_{ki}$<0.95 (step 228), wherein 0.95 is a threshold for a risk index, which indicates a percentage of the RUL for the asset k, which has already elapsed. If not (NO at step 228), the system generates a notification to take asset k out of service (step 230), and returns to step 210 to analyze another asset. Otherwise, if RUL estimate$_k$<0.95 (YES at step 228), the system increments the signal counter by setting i=i+1 (step 232), and returns to step 208 to analyze another signal.

Note that instead of (or in addition to) varying the SPRT parameter M, which is associated with the positive mean test and the negative mean test, the system can also vary a parameter V, which is associated with a nominal variance test and an inverse variance test for the SPRT, to reduce the sensitivity of the SPRT.

Figure 3:
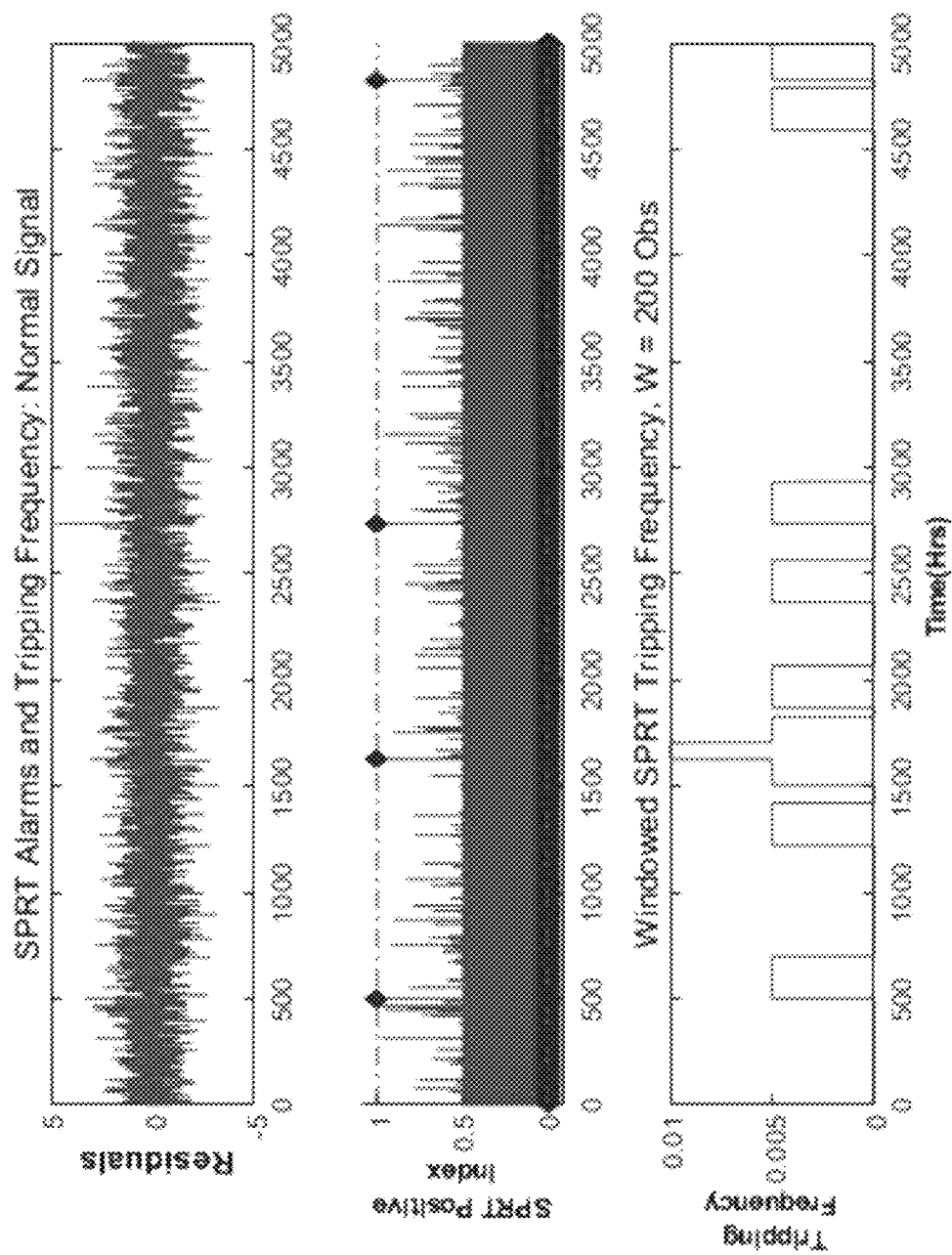
FIG. 3 presents graphs associated with SPRT tripping frequencies for an exemplary signal during normal operation with no degradation in accordance with the disclosed embodiments.

FIG. 3 illustrates the SPRT tripping frequency with an associated index and residuals for a signal from an asset during normal operation with no degradation. Note that there exists no degradation in the sensor, which is monitored by the SPRT in FIG. 3. Hence, the SPRT alarms are normal as is expected from the Wald theorem. Only when the frequency of SPRT alarms exceeds a pre-specified value of a (false alarm probability for the SPRT) will an SPRT alarm be triggered.

Figure 4:
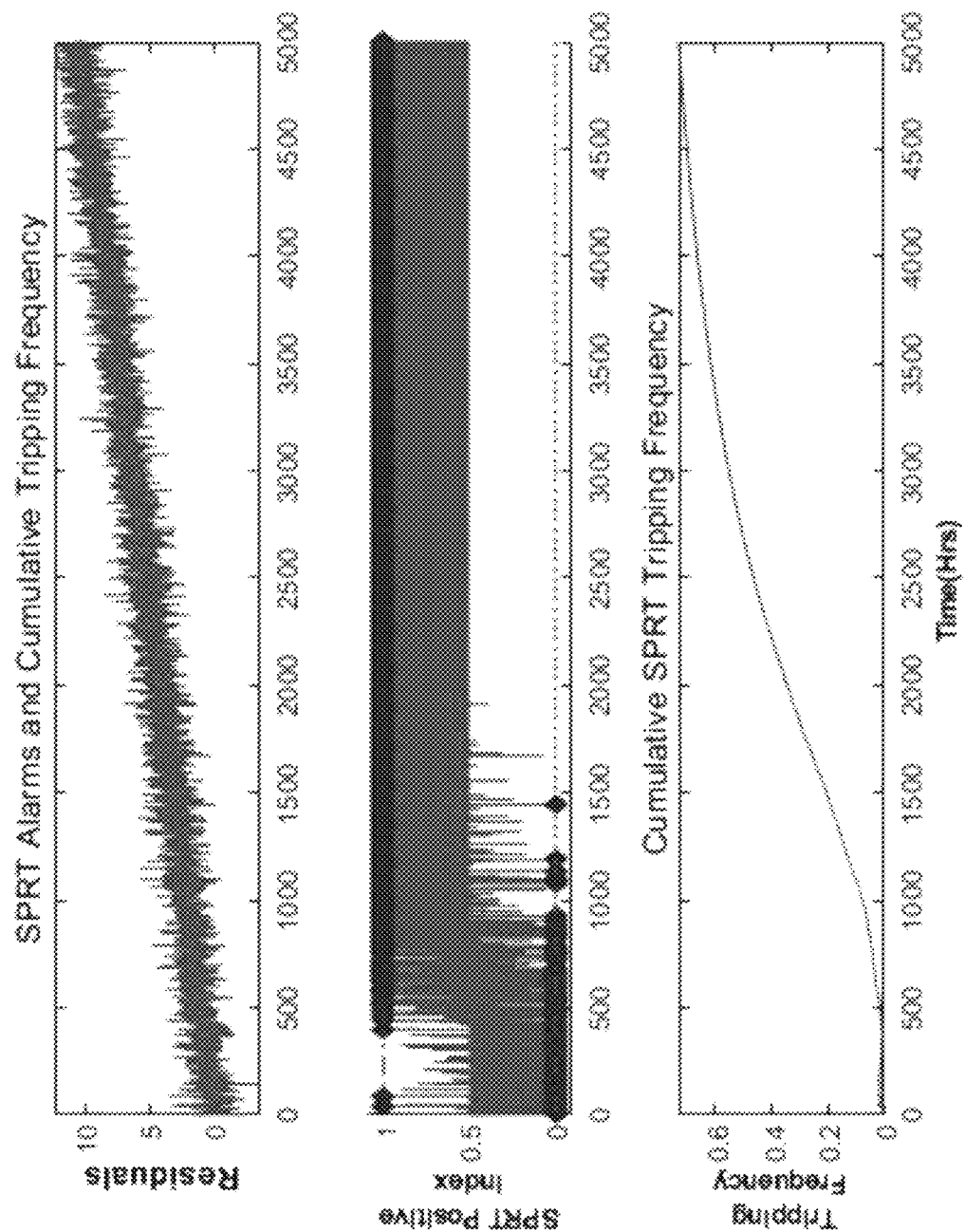
FIG. 4 presents graphs associated with SPRT tripping frequencies for a degraded signal in accordance with the disclosed embodiments.

In contrast, FIG. 4 illustrates SPRT alarms and an associated cumulative SPRT tripping frequency for a degraded signal. Note that the degradation is manifested as a ramp in the residuals. Moreover, the cumulative SPRT tripping frequency, which is illustrated in the bottom subplot, plateaus asymptotically toward 1.0 after an extremely long time because it uses the entire history of the observed SPRT alarms. To mitigate this long-term "inertial effect," which arises when one tracks the cumulative TF over a long time interval, we use a "windowed" SPRT tripping frequency over a shorter time window to avoid the very long asymptotes. This windowed SPRT TF provides a more accurate continuous indication of the severity of the degradation in the asset.

Our new technique incorporates a metric derived from the windowed TF to produce a "risk index," which provides a continuous indication of the quantitative risk of continuing to operate the asset until a time T in the future. In an exemplary embodiment, we set a threshold for this risk index at 95%. This means that if the quantitative risk index reaches 0.95, an alert is generated to discontinue service for the asset.

Note that all RUL-estimation techniques, including our new technique, are trained using historical data from assets that have been run all the way to failure. Moreover, conventional mean-time-between-failure (MTBF) metrics that have been used by engineers for decades have to be trained with actual failure histories of the assets to which they apply. However, no matter how diligently reliability engineers compute a conventional MTBF metric for a class of assets, knowing the MTBF metric says nothing about whether the asset will fail within a week, a month, or a year. For example, an asset with an MTBF of 5 years can fail within a few days. This means that a utility system with 400 expensive transformers in their grid, all with 5-year MTBFs, will be likely to experience multiple failures each year. This is the case because a conventional MTBF imparts no predictive information, and no relative risk information for continued operation of an asset. By contrast, our new RUL-estimation technique monitors the evolution of a quantitative risk index and associated RUL estimates for every individual asset that is in service. It begins with the same historical failure information, which has always been used to compute MTBFs, but uses this historical failure information to provide proactive fault monitoring for individual assets as is described below.

Figure 5:
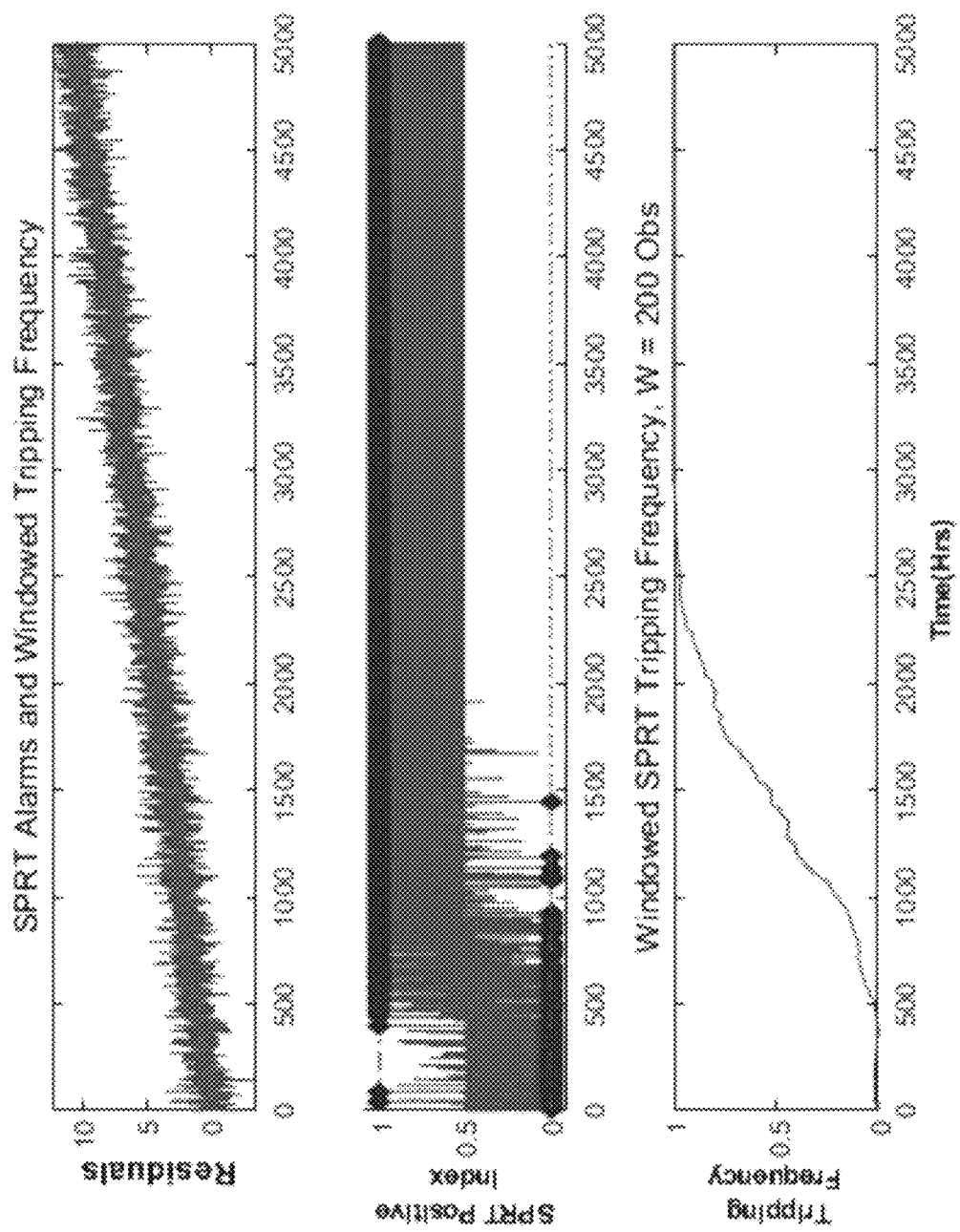
FIG. 5 presents graphs associated with "windowed" SPRT tripping frequencies for a degraded signal in accordance with the disclosed embodiments.

FIG. 5 illustrates graphs associated with "windowed" SPRT tripping frequencies for a degraded signal in accordance with the disclosed embodiments. Note that as the degradation continues to worsen, eventually the SPRT TF "saturates," which means that every new observation of the monitored signal triggers an SPRT alarm. For example, in the bottom subplot in FIG. 5, at about 3000 hours into the simulation, the SPRT tripping frequency goes to unity. TF saturation is undesirable for downstream RUL processing. While the TF curve is changing with time in the curved region between the onset of the degradation at about 500 hrs until the TF saturates at about 3000 hrs, the "curvature" provides information that the RUL-estimation technique uses to dynamically compute the quantitative risk. However, when TF saturation occurs, the TF curve becomes a flat line at unity, which means that the RUL-estimation technique is no longer receiving "curvature" information to provide prognostic information.

To overcome this problem, our new technique provides an "adaptive SPRT," in which as TF approaches saturation, SPRT sensitivity parameters are systematically adjusted to avoid saturation. This provides two significant advantages that facilitate RUL estimation. Specifically, our new technique: (1) detects early curvature at the onset of subtle degradation symptoms, and (2) provides continuous curvature throughout the evolution of the degradation, even if the asset continues to operate for months or years, because the SPRT TF never "saturates."

Figure 6:
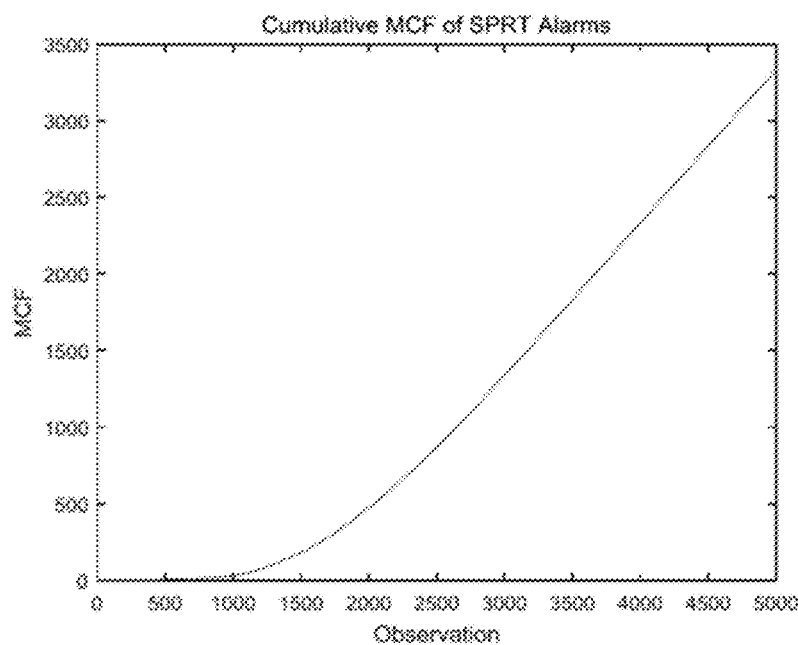
FIG. 6 presents a graph illustrating a mean cumulative function (MCF) of SPRT alarms for a degraded signal in accordance with the disclosed embodiments.

To illustrate how this is achieved, the mean cumulative function (MCF) is obtained by plotting the cumulative counts of SPRT alarms as is illustrated by the MCF plot in FIG. 6. From reliability theory, if SPRT alarms are random in time, the MCF curve follows a straight line. Note that during a time interval when SPRT alarms are increasing, the MCF curve is concave upwards. Consequently, by computing a derivative of the MCF curve during this time interval, we can infer the onset of increasing SPRT tripping frequencies (TFs).

Hence, our technique computes a moving-window "localized" derivative of the aggregate MCF, which we call simply the derivative of the MCF, or dMCF. When there is any degree of degradation in the monitored telemetry signals, it shows up in the dMCF curve. Consequently, the dMCF curve becomes a proxy for the severity of degradation of signal, which can be used to calibrate a probability of failure in our RUL-estimation technique.

Note that the SPRT sensitivity is controlled by an internal "gain" parameter M, which is associated with a positive mean test and a negative mean test for the SPRT. (See "Early Detection of Signal Process Anomalies in Enterprise Computing Systems," by Kenny C. Gross and Wendy Lu, *Proceedings of the IEEE International Conference on Machine Learning and Applications*, Jun. 24-27, 2002.) Note that setting M to a small value, such as 2 or 3, provides very good sensitivity for generating SPRT alarms at the earliest onset of subtle degradation in sensor signals. This facilitates the goal of catching subtle degradation early, and then scheduling the earliest possible replacement of affected components at the next shutdown opportunity. However, this is in sharp contrast to the long-term asset-survival goals addressed by our new RUL-estimation technique, where a high-sensitivity (low M) SPRT can become disadvantageous because the SPRT TF will quickly saturate.

Figure 7:
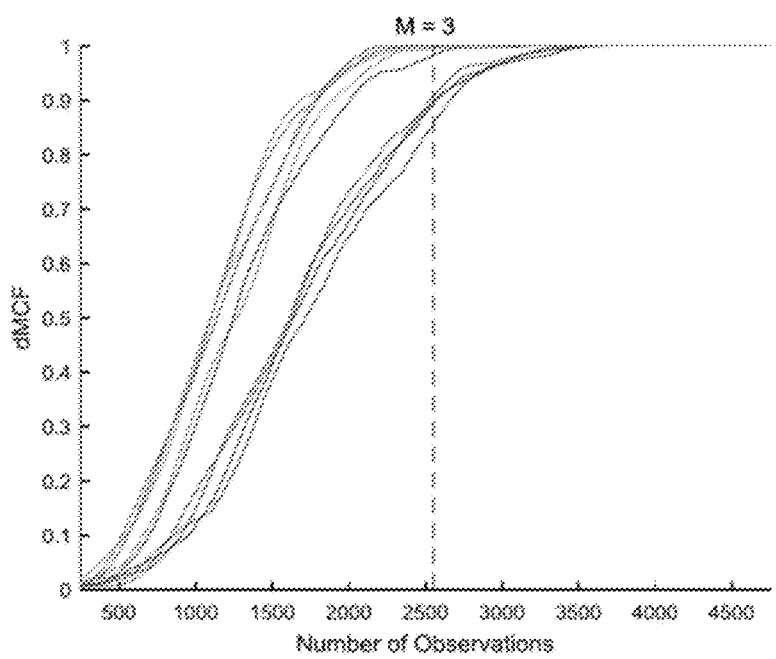
FIG. 7 presents a graph illustrating sample dMCFs for assets experiencing degradation when M=3 in accordance with the disclosed embodiments.
Figure 8:
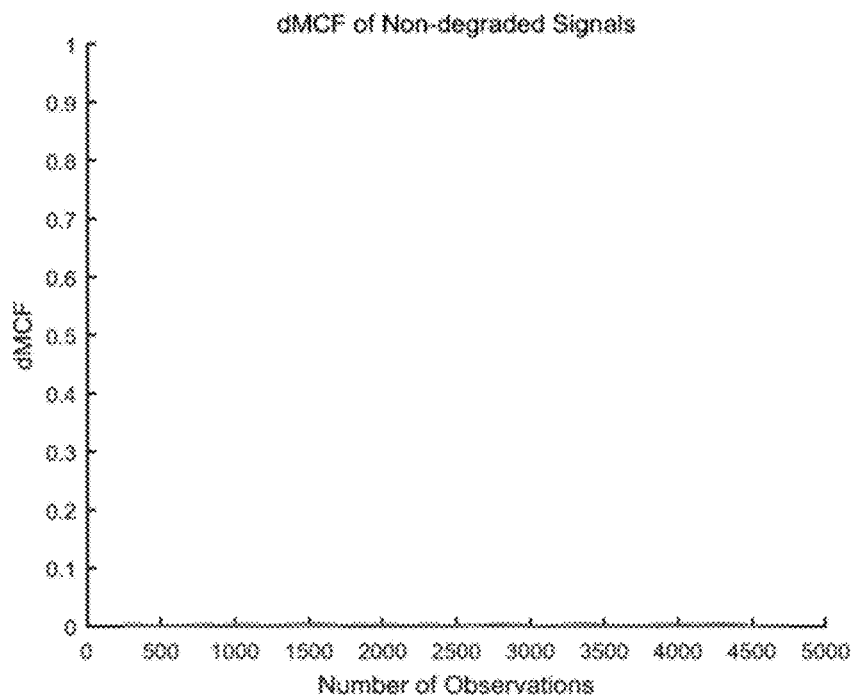
FIG. 8 presents a graph illustrating sample dMCFs for assets experiencing degradation in accordance with the disclosed embodiments.

For example, FIG. 7 presents a graph illustrating exemplary dMCFs for assets experiencing degradation where M=3 in accordance with the disclosed embodiments. Note that the earliest failure time for assets under surveillance is represented by the dotted black line. In contrast, FIG. 8 illustrates dMCF of assets under normal operation with no degradation.

Figure 9:
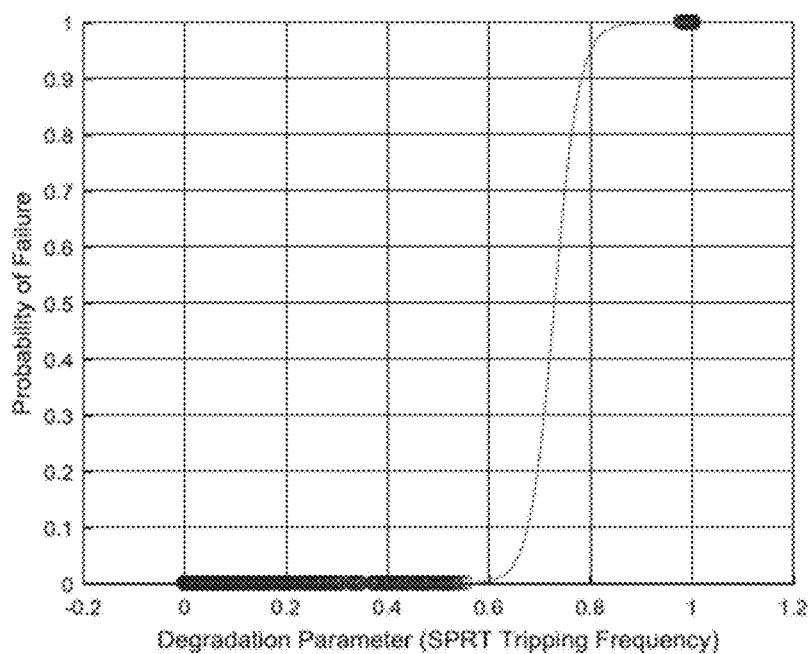
FIG. 9 presents a graph illustrating a logistic regression fit for the probability of failure corresponding to dMCF plots for degraded assets in accordance with the disclosed embodiments.

FIG. 9 presents a curved line illustrating a logistic regression fit for the probability of failure corresponding to the dMCF plot of degraded assets illustrated in FIG. 7. The circles in FIG. 9 represent asset failure data, wherein each circle represents an individual system/component failure obtained from historical or experimental data. In FIG. 9, the dMCF value of a failed asset at time of failure is represented as the corresponding circle's x-value in the plot. Note that the circles at the value "0" on the x-axis represent assets that did not fail, and the circles at the value "1.0" on the x-axis represent assets that failed. The logistic regression, which was used to generate the curved line, operates by fitting a curve through data under two categories with respect to a single variable. Here, the independent variable is the dMCF value, and the two categories are failed assets and non-failed assets. Note that if we set the value of the failed category to "1.0" and the non-failed category to "0," we obtain a curve that shows the probability of asset failure with respect to the dMCF value.

Figure 10:
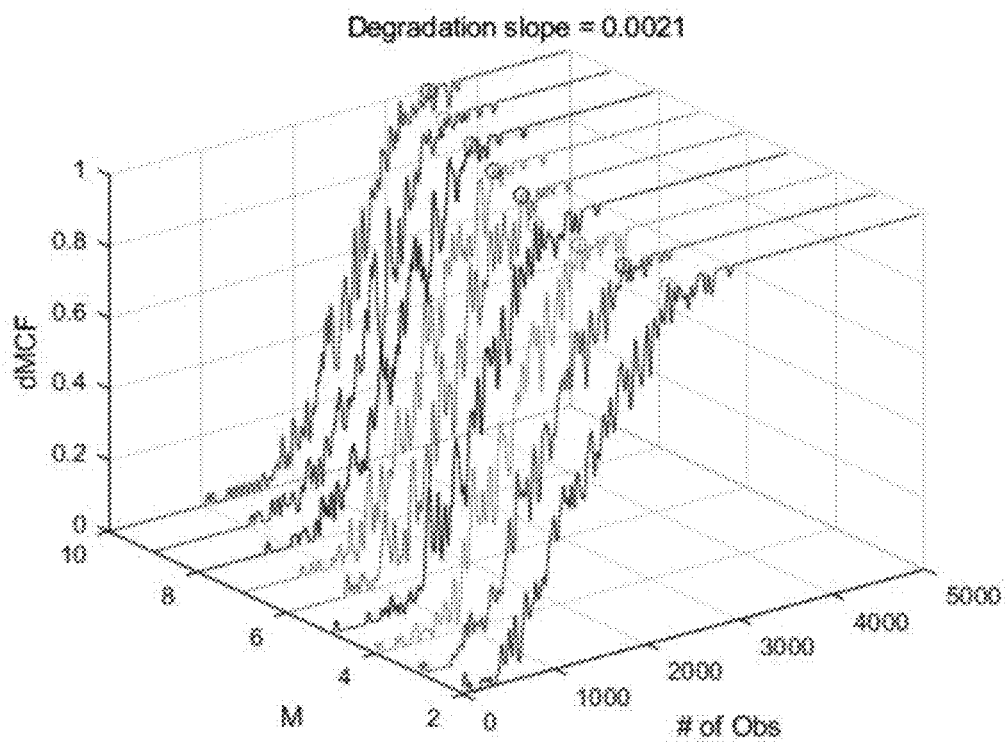
FIG. 10 presents a graph illustrating the dMCF of a single signal with a systematic variation in the M parameter in accordance with the disclosed embodiments.

The plot in FIG. 10 illustrates the dMCF of a single signal in which we introduce a systematic variation in the M parameter. Observe that the saturation time of the dMCF is pushed further back every time that M increases. The circles mark the time when the dMCF hits 0.99.

Figure 11:
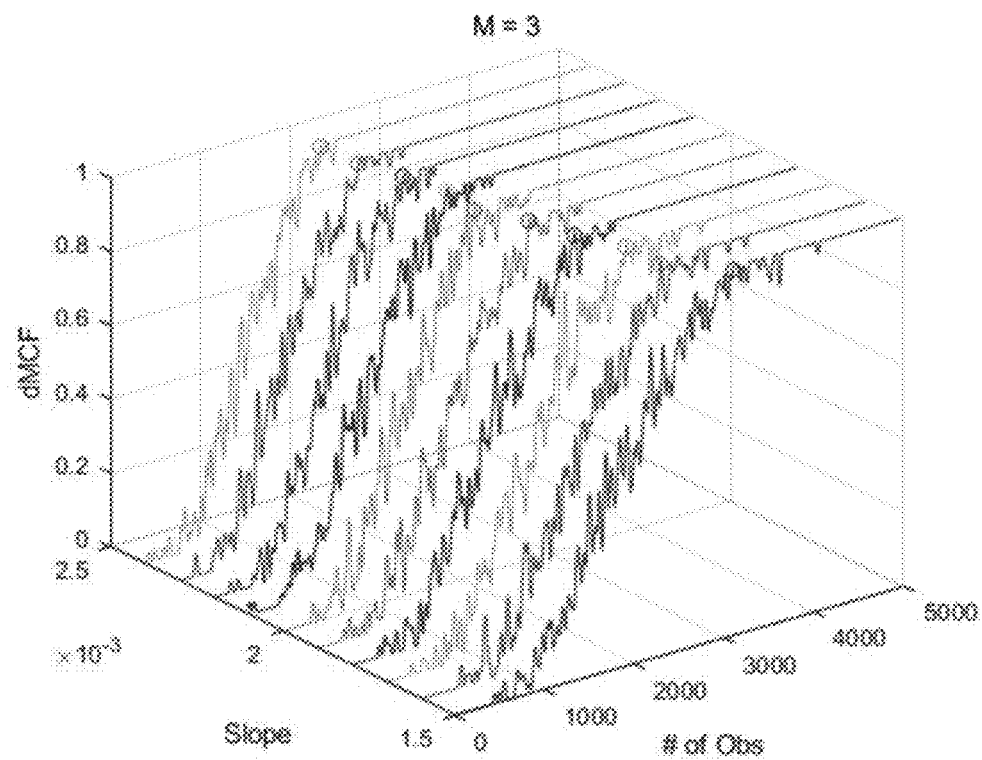
FIG. 11 presents a graph illustrating the same signal as in FIG. 10 with variations in the slope of the degradation ramp in accordance with the disclosed embodiments.

FIG. 11 illustrates the same signal with variations in the slope of the degradation ramp. (Recall that the slope of the degradation ramp indicates the degree of severity of the degradation.) Note that as degradation increases the saturation time of the dMCF occurs earlier. The circles mark the time when the dMCF hits 0.99, which occurs just before TF saturation. From these simulations, we see that as the severity of degradation in an asset increases, the saturation time occurs earlier. However, as the internal sensitivity parameter M is increased, we "push back" the saturation time.

Figure 12:
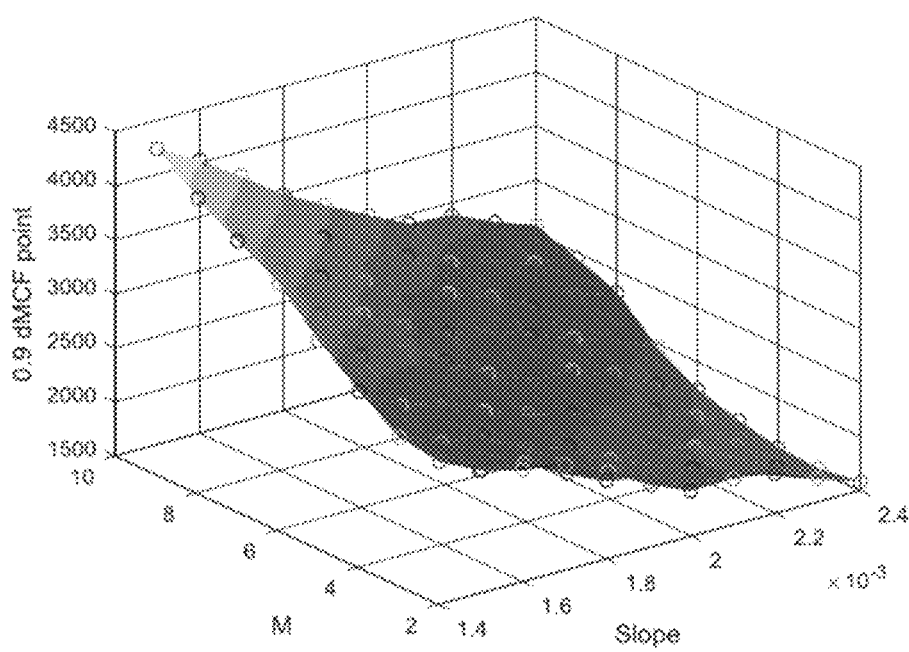
FIG. 12 presents a graph illustrating a surface fitted plot for saturation time (when dMCF reaches 0.9) as the saturation time varies with the parameter M in accordance with the disclosed embodiments.

FIG. 12 shows a surface fitted plot for saturation time (when dMCF reaches the 0.9 point) as the saturation time varies with the parameter M and the severity of the degradation (slope). Note that earlier saturation times (red zones) are undesirable for long-term RUL estimation. In contrast, long saturation times (green zones) are good for assets that survive with moderate degradation for long term operation in the field.

Figure 13:
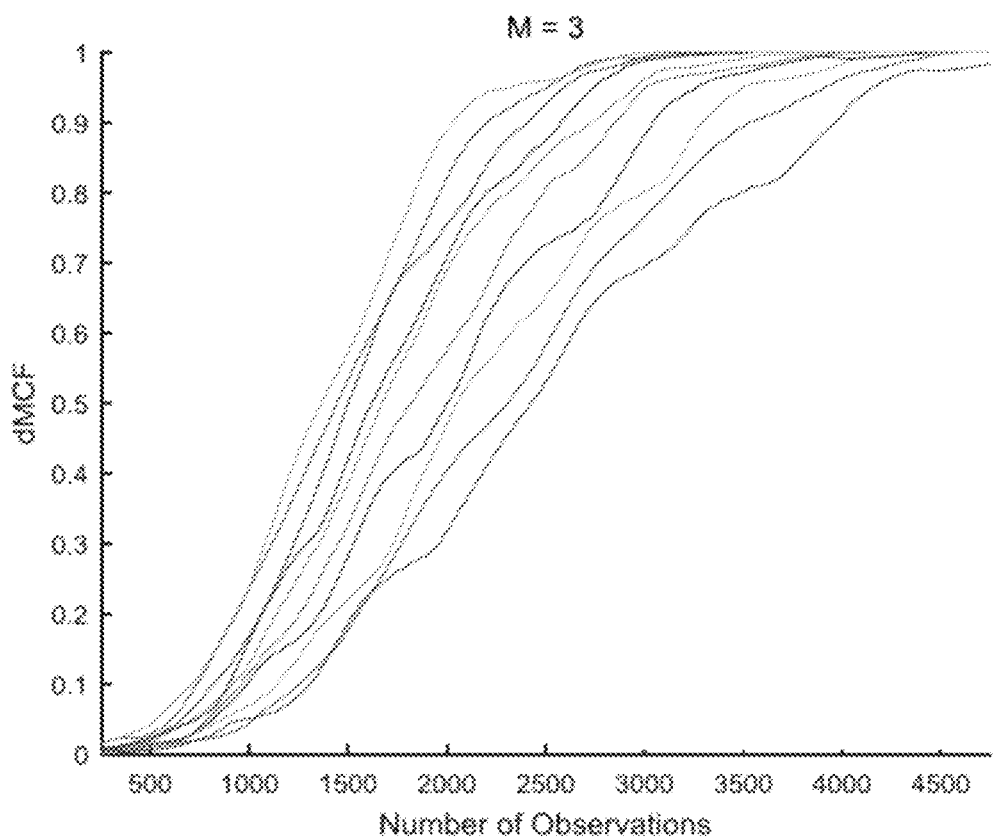
FIG. 13 presents a graph illustrating dMCFs associated with different degradation slopes when M=3 in accordance with the disclosed embodiments.
Figure 14:
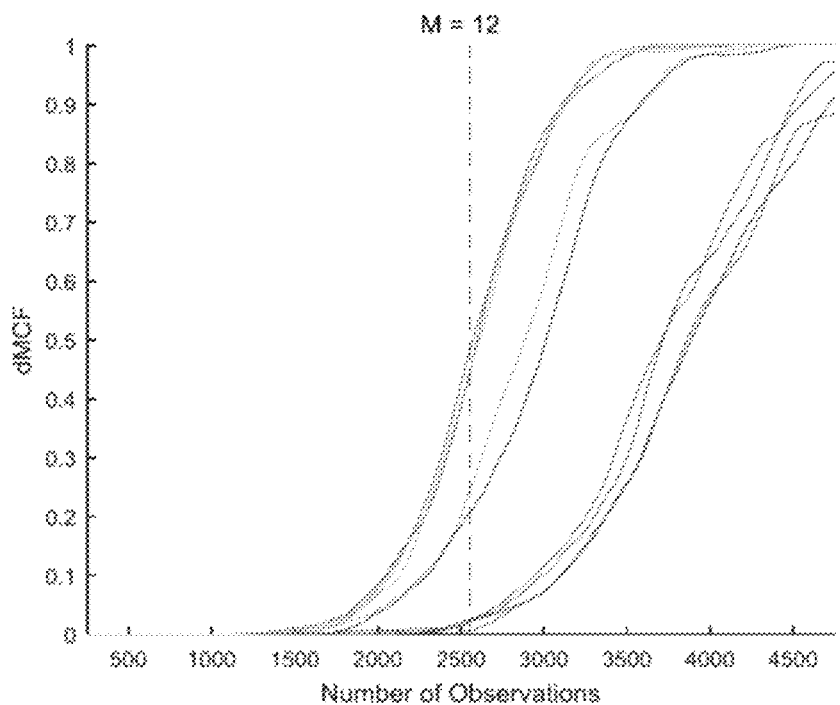
FIG. 14 presents a graph illustrating dMCFs associated with different degradation slopes when M=12 in accordance with the disclosed embodiments.

FIGS. 13 and 14 illustrate how systematically increasing the M parameter delays the saturation time of the dMCF. We make use of an important parameter called the average sample number (ASN), which is the average number of observations processed before an SPRT alarm is raised. While M was increased in increments of 1 in our simulations, only the plots for M=3 and M=12 are shown in FIGS. 13 and 14, respectively. (Note that the results progress monotonically between M=3 and M=12, so we are illustrating only the beginning and ending plots.) M is incremented and the dMCFs are recomputed whenever the ASN falls below a set threshold. (In this example, the threshold is set to 2, which indicates the tripping frequency is getting very close to saturation.)

Figure 15:
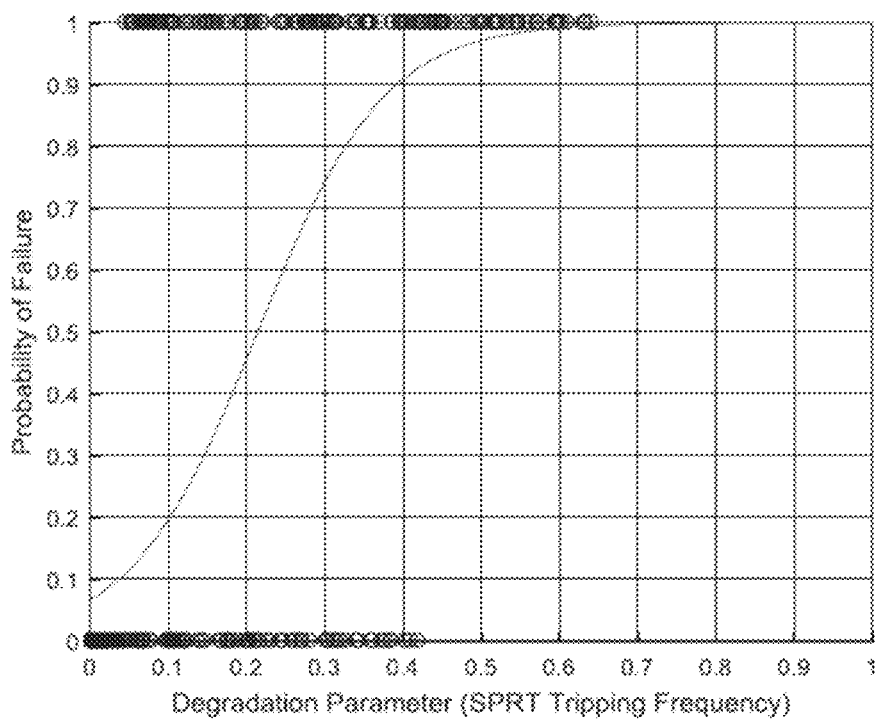
FIG. 15 presents a graph illustrating a logistic regression curve for the probability of failure corresponding to the M=12 dMCF plot in FIG. 14 in accordance with the disclosed embodiments.

Upon reaching M=12, the ASN remains above the threshold, which means that no SPRT TFs for any assets under surveillance have saturated. This indicates that this RUL-estimation technique continues to provide accurate RUL estimates for all monitored assets. FIG. 15 illustrates the corresponding logistic regression curve for the probability of failure corresponding to the M=12 dMCF plot in FIG. 14.

Adaptive SPRT

Figure 16:
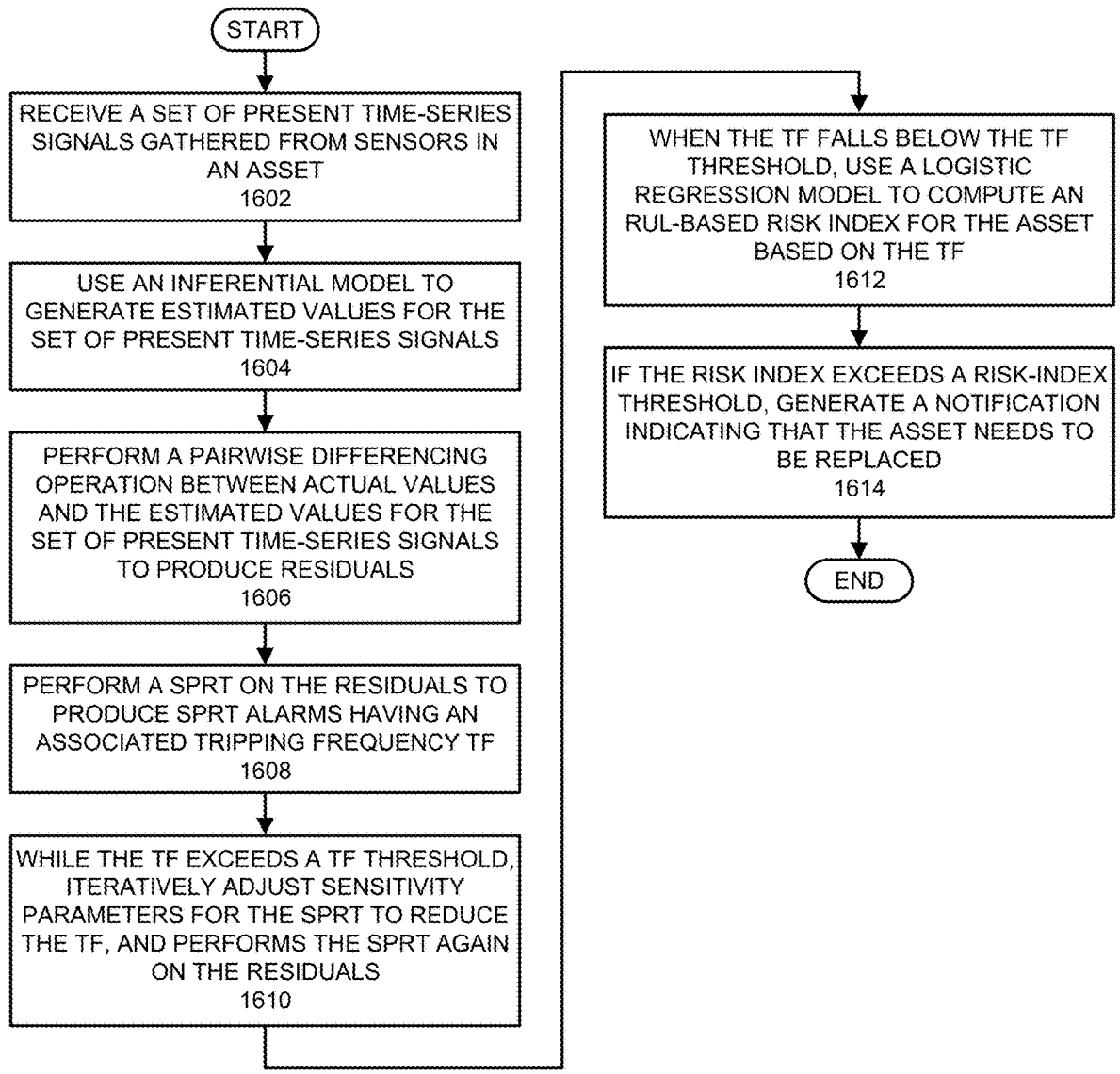
FIG. 16 presents a flow chart illustrating a process that performs an adaptive SPRT to facilitate robust RUL estimation for critical assets in a system under surveillance in accordance with the disclosed embodiments.

FIG. 16 presents a flow chart illustrating a process that performs an adaptive SPRT to facilitate robust RUL estimation for critical assets in a system under surveillance in accordance with the disclosed embodiments. While operating in a surveillance mode, the system receives a set of present time-series signals gathered from sensors in the asset (step 1602). Next, the system uses an inferential model to generate estimated values for the set of present time-series signals (step 1604), and performs a pairwise differencing operation between actual values and the estimated values for the set of present time-series signals to produce residuals (step 1606). The system then performs an SPRT on the residuals to produce SPRT alarms having an associated tripping frequency TF (step 1608). While the TF exceeds a TF threshold, the system iteratively adjusts sensitivity parameters for the SPRT to reduce the TF, and performs the SPRT again on the residuals (step 1610). When the TF falls below the TF threshold, the system uses a logistic regression model to compute an RUL-based risk index for the asset based on the TF (step 1612). If the risk index exceeds a risk-index threshold, the system generates a notification indicating that the asset needs to be replaced (step 1614).

Figure 17:
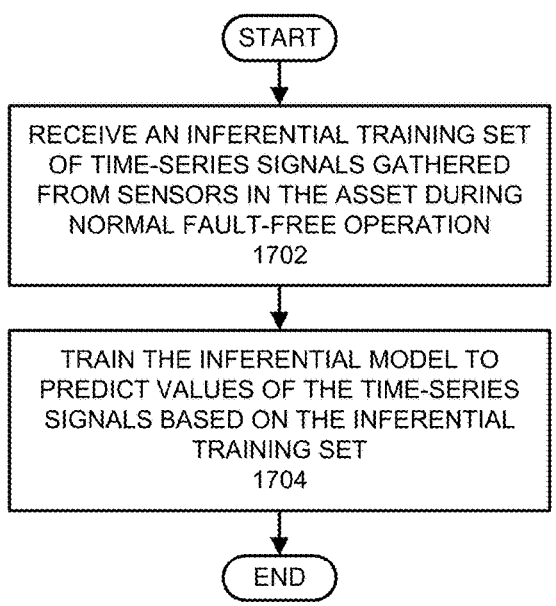
FIG. 17 presents a flow chart illustrating a process for training an inferential model in accordance with the disclosed embodiments.

FIG. 17 presents a flow chart illustrating a process for training an inferential model in accordance with the disclosed embodiments. During an inferential-training mode, which precedes the surveillance mode, the system receives an inferential training set of time-series signals gathered from sensors in the asset during normal fault-free operation (step 1702). Next, the system trains the inferential model to predict values of the time-series signals based on the inferential training set (step 1704).

Figure 18:
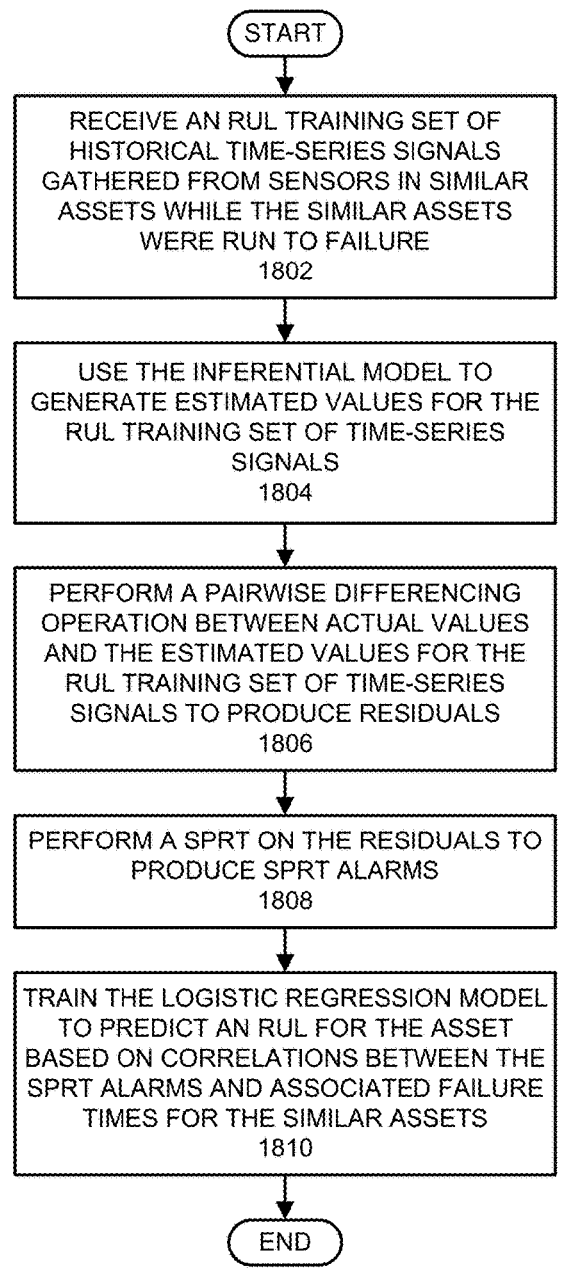
FIG. 18 presents a flow chart illustrating a process for training a logistic regression model to predict an RUL for an asset in accordance with the disclosed embodiments.

FIG. 18 presents a flow chart illustrating a process for training a logistic regression model to predict an RUL for an asset in accordance with the disclosed embodiments. During an RUL-training mode, which follows the inferential training mode and precedes the surveillance mode, the system receives an RUL training set of historical time-series signals gathered from sensors in similar assets while the similar assets were run to failure (step 1802). (Note that the inferential training set can possibly be the same as the RUL training set.) The system then uses the inferential model to generate estimated values for the RUL training set of time-series signals (step 1804), and performs a pairwise differencing operation between actual values and the estimated values for the RUL training set of time-series signals to produce residuals (step 1806). Next, the system performs an SPRT on the residuals to produce SPRT alarms (step 1808), and then trains the logistic regression model to predict an RUL for the asset based on correlations between the SPRT alarms and associated failure times for the similar assets (step 1810).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for estimating a remaining useful life (RUL) of an asset, wherein during a surveillance mode, the method comprises:
receiving a set of present time-series signals gathered from sensors in the asset;
using an inferential model to generate estimated values for the set of present time-series signals;
performing a pairwise differencing operation between actual values and the estimated values for the set of present time-series signals to produce residuals;

performing a sequential probability ratio test (SPRT) on the residuals to produce SPRT alarms having an associated tripping frequency (TF);

while the TF exceeds a TF threshold, iteratively adjusting sensitivity parameters for the SPRT to reduce the TF, and performing the SPRT again on the residuals; and when the TF for the SPRT alarms falls below the TF threshold, using a logistic regression model to compute an RUL-based risk index for the asset based on the TF, and when the risk index exceeds a risk-index threshold, generating a notification indicating that the asset needs to be replaced.

2. The method of claim 1, wherein during an inferential-training mode, which precedes the surveillance mode, the method further comprises:

receiving an inferential training set of time-series signals gathered from sensors in the asset during normal fault-free operation; and training the inferential model to predict values of the time-series signals based on the inferential training set.

3. The method of claim 2, wherein during an RUL-training mode, which follows the inferential training mode and precedes the surveillance mode, the method further comprises:

receiving an RUL training set of historical time-series signals gathered from sensors in similar assets while the similar assets were run to failure;

using the inferential model to generate estimated values for the RUL training set of time-series signals;

performing a pairwise differencing operation between actual values and the estimated values for the RUL training set of time-series signals to produce residuals;

performing an SPRT on the residuals to produce SPRT alarms; and training the logistic regression model to predict an RUL for the asset based on correlations between the SPRT alarms and associated failure times for the similar assets.

4. The method of claim 1, wherein the sensitivity parameters for the SPRT include one or more of the following:

a false alarm probability parameter $\alpha$;

a missed alarm probability parameter $\beta$;

a parameter M associated with a positive mean test and a negative mean test for the SPRT; and a parameter V associated with a nominal variance test and an inverse variance test for the SPRT.

5. The method of claim 1, wherein the TF is a windowed TF, which is associated with a preceding time window of SPRT alarms.

6. The method of claim 1, wherein the asset comprises one of the following:

a component in a power generation system; and a component in a power transmission system.

7. The method of claim 1, wherein the inferential model comprises a Multivariate State Estimation Technique (MSET) model.

8. A non-transitory, computer-readable storage medium storing instructions that when executed by a computer cause the computer to perform a method for estimating a remaining useful life (RUL) of an asset, wherein during a surveillance mode, the method comprises:

receiving a set of present time-series signals gathered from sensors in the asset;

using an inferential model to generate estimated values for the set of present time-series signals;

performing a pairwise differencing operation between actual values and the estimated values for the set of present time-series signals to produce residuals;

performing a sequential probability ratio test (SPRT) on the residuals to produce SPRT alarms having an associated tripping frequency (TF);

while the TF exceeds a TF threshold, iteratively adjusting sensitivity parameters for the SPRT to reduce the TF, and performing the SPRT again on the residuals; and when the TF for the SPRT alarms falls below the TF threshold, using a logistic regression model to compute an RUL-based risk index for the asset based on the TF, and when the risk index exceeds a risk-index threshold, generating a notification indicating that the asset needs to be replaced.

9. The non-transitory, computer-readable storage medium of claim 8, wherein during an inferential-training mode, which precedes the surveillance mode, the method further comprises:

receiving an inferential training set of time-series signals gathered from sensors in the asset during normal fault-free operation; and training the inferential model to predict values of the time-series signals based on the inferential training set.

10. The non-transitory, computer-readable storage medium of claim 9, wherein during an RUL-training mode, which follows the inferential training mode and precedes the surveillance mode, the method further comprises:

receiving an RUL training set of historical time-series signals gathered from sensors in similar assets while the similar assets were run to failure;

using the inferential model to generate estimated values for the RUL training set of time-series signals;

performing a pairwise differencing operation between actual values and the estimated values for the RUL training set of time-series signals to produce residuals;

performing an SPRT on the residuals to produce SPRT alarms; and training the logistic regression model to predict an RUL for the asset based on correlations between the SPRT alarms and associated failure times for the similar assets.

11. The non-transitory, computer-readable storage medium of claim 8, wherein the sensitivity parameters for the SPRT include one or more of the following:

a false alarm probability parameter $\alpha$;

a missed alarm probability parameter $\beta$;

a parameter M associated with a positive mean test and a negative mean test for the SPRT; and a parameter V associated with a nominal variance test and an inverse variance test for the SPRT.

12. The non-transitory, computer-readable storage medium of claim 8, wherein the TF is a windowed TF, which is associated with a preceding time window of SPRT alarms.

13. The non-transitory, computer-readable storage medium of claim 8, wherein the asset comprises one of the following:

a component in a power generation system; and a component in a power transmission system.

14. The non-transitory, computer-readable storage medium of claim 8, wherein the inferential model comprises a Multivariate State Estimation Technique (MSET) model.

15. A system that estimates a remaining useful life (RUL) of an asset, comprising:

at least one processor and at least one associated memory; and a notification mechanism that executes on the at least one processor, wherein during a surveillance mode, the notification mechanism:

receives a set of present time-series signals gathered from sensors in the asset;

uses an inferential model to generate estimated values for the set of present time-series signals;

performs a pairwise differencing operation between actual values and the estimated values for the set of present time-series signals to produce residuals;

performs a sequential probability ratio test (SPRT) on the residuals to produce SPRT alarms having an associated tripping frequency (TF);

while the TF exceeds a TF threshold, iteratively adjusts sensitivity parameters for the SPRT to reduce the TF, and performs the SPRT again on the residuals; and when the TF for the SPRT alarms falls below the TF threshold,
- uses a logistic regression model to compute an RUL-based risk index for the asset based on the TF, and
- when the risk index exceeds a risk-index threshold, generates a notification indicating that the asset needs to be replaced.

16. The system of claim 15, wherein during an inferential-training mode, which precedes the surveillance mode, the notification mechanism:

receives an inferential training set of time-series signals gathered from sensors in the asset during normal fault-free operation; and trains the inferential model to predict values of the time-series signals based on the inferential training set.

17. The system of claim 16, wherein during an RUL-training mode, which follows the inferential training mode and precedes the surveillance mode, the notification mechanism:

receives an RUL training set of historical time-series signals gathered from sensors in similar assets while the similar assets were run to failure;

uses the inferential model to generate estimated values for the RUL training set of time-series signals;

performs a pairwise differencing operation between actual values and the estimated values for the RUL training set of time-series signals to produce residuals;

performs an SPRT on the residuals to produce SPRT alarms; and trains the logistic regression model to predict an RUL for the asset based on correlations between the SPRT alarms and associated failure times for the similar assets.

18. The system of claim 15, wherein the sensitivity parameters for the SPRT include one or more of the following:

a false alarm probability parameter $\alpha$;

a missed alarm probability parameter $\beta$;

a parameter M associated with a positive mean test and a negative mean test for the SPRT; and a parameter V associated with a nominal variance test and an inverse variance test for the SPRT.

19. The system of claim 15, wherein the TF is a windowed TF, which is associated with a preceding time window of SPRT alarms.

20. The system of claim 15, wherein the asset comprises one of the following:

a component in a power generation system; and a component in a power transmission system.

* * * * *

UNITED STATES PATENT AND TRADEMARK OFFICE
CERTIFICATE OF CORRECTION

| | | |
|---|---|---|
| PATENT NO. | : 11,307,569 B2 | Page 1 of 1 |
| APPLICATION NO. | : 16/282087 | |
| DATED | : April 19, 2022 | |
| INVENTOR(S) | : Gross et al. | |

It is certified that error appears in the above-identified patent and that said Letters Patent is hereby corrected as shown below:

In the Specification

In Column 6, Line 41, delete "signalk," and insert -- signalki --, therefor.

In Column 6, Line 52, delete "estimatek," and insert -- estimateki --, therefor.

In Column 6, Line 59, delete "estimatek" and insert -- estimateki --, therefor.

Signed and Sealed this
Sixth Day of September, 2022

Katherine Kelly Vidal
*Director of the United States Patent and Trademark Office*